J. B. MARTINDALE.
HOOK AND EYE.
No. 62,554.                    Patented Mar. 5, 1867.
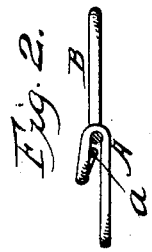
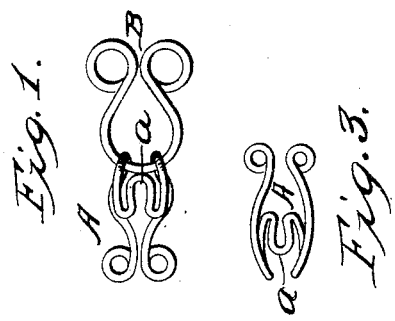
Witnesses:
Inventor.

United States Patent Office.

JAMES B. MARTINDALE, OF NEW CASTLE, INDIANA.

Letters Patent No. 62,554, dated March 5, 1867.

IMPROVEMENT IN HOOKS AND EYES.

*The Schedule referred to in these Letters Patent and making part of the same.*

TO ALL WHOM IT MAY CONCERN:

Be it known that I, JAMES B. MARTINDALE, of New Castle, in the county of Henry, and State of Indiana, have invented a new and useful Improvement in the Construction of Hooks and Eyes; and I do hereby declare that the following is a full, clear, and exact description of the same, reference being had to the annexed drawings, in which—

Figures 1 and 3 are plans; and

Figure 2, a longitudinal central section.

The same letters are employed in both figures in the indication of identical parts.

My invention consists in so constructing the hook that the eye, when attached, is held by a part of the hook acting as a spring-catch, and can only be detached when the opposite end of the eye is raised at right angles, or nearly so, to the hook.

The following description will enable a person skilled in the art to construct the same:

A is the hook and B the eye. The hook is formed from a bent wire, as shown in figs. 1 and 3. The loop in the hook at $a$ is bent down until the point thereof is nearer the plane of the wires at $b\ b$ than the diameter of the wire of which the eye is formed, so that the loop $a$ is made to act as a spring-catch, rising so as to permit the eye to pass under it when drawn against its inclined face, but preventing its return as long as the hook and eye are on the same line. The wires forming the shank of the hook are bowed outwards at $b\ b$, to such distance that when the eye is raised at right angles to the hook, the curvature of the eye between the points $b\ b$, on which it rests, will carry its inner edge below the point at $a$, and permit the eye to be detached.

What I claim as my invention, and desire to secure by Letters Patent, is—

The hook A, when constructed and arranged to operate in combination with the eye B, substantially as set forth.

In testimony whereof I have signed my name to this specification in the presence of two subscribing witnesses.

JAMES B. MARTINDALE.

Witnesses:
W. E. FORHNER,
H. L. POWELL.